United States Patent Office 3,369,029
Patented Feb. 13, 1968

3,369,029
3-GUANIDINO-ALKYLENE-CHROMANS
Joachim Augstein and Alastair M. Monro, Canterbury, Kent, England, assignors to Chas. Pfizer & Co., Inc., New York, N.Y., a corporation of Delaware
No Drawing. Filed Sept. 27, 1965, Ser. No. 490,625
Claims priority, application Great Britain, Oct. 1, 1964, 39,932/64
9 Claims. (Cl. 260—345.2)

This invention relates to new and useful compounds in the field of organic heterocycle chemistry. More particularly, it is concerned with various novel 3-guanidino-alkylchromans which have been found to be useful as therapeutic agents in view of the biological properties which they possess.

The compounds which are included within the purview of the present invention are all selected from the class of organic bases having the following general structural formula:

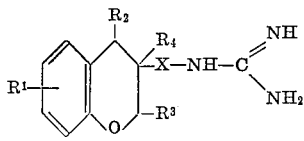

and the mineral and organic acid addition salts thereof, wherein $R^1$ is a member selected from the group consisting of hydrogen, chlorine, bromine, iodine, alkyl and alkoxy each having up to six carbon atoms; $R^2$, $R^3$ and $R^4$ are each a member selected from the group of hydrogen and alkyl containing up to six carbon atoms; and X is $-(CH_2)_n-$, wherein $n$ is an integer of from one to four. It is to be noted that the substituent $R^1$ may be situated at any available position in the benzene ring. Compounds of this class are of value in the treatment of hypertension.

Of especial value in this connection, and as a matter of fact the preferred compounds of this invention, are those of the formula:

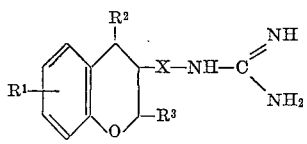

and the mineral and organic acid addition salts thereof, wherein $R^1$ is a member selected from the group consisting of hydrogen, chlorine, bromine, lower alkyl and lower alkoxy; $R^2$ and $R^3$ are each a member selected from the group consisting of hydrogen and lower alkyl; X is lower alkylene. Typical member compounds of this series include such compounds as 3-guanidinomethylchroman, 3-guanidinomethyl - 2 - methylchroman, 3 - (3 - guanidinopropyl)chroman, 3 - guanidinomethyl - 7-chlorochroman, and the like. 3-guanidinomethylchroman and other compounds of this series are potent regulators of the cardiovascular system and, as previously indicated, are especially active as anti-hypertensive agents, in addition to being effective as adrenolytic agents.

The process employed for preparing the novel compounds of this invention involves treating an appropriately substituted 3-aminoalkylchroman compound with a suitable S-alkyl isothiouronium salt. This particular reaction is normally carried out in a reaction-inert polar solvent medium at a temperature ranging from about 20° C. up to about 120° C. for a period of about four to about 72 hours, and most conveniently at a temperature ranging from about 60° C. to about 100° C. for from about 4 to 20 hours. In practice, it is generally most convenient to heat the two reactants together under reflux in the polar solvent, employing substantially equimolar amounts of starting materials for this purpose although a slight excess of one or the other is not harmful in this respect. The desired S-alkyl isothiouronium salt reagent, of course, is preferably one where the S-alkyl group is lower alkyl in view of relative ease with which such a reaction takes place due to the more volatile nature of the by-products produced, i.e., the lower boiling mercaptans. Preferred reaction-inert polar solvents for use in this connection include water, lower alkanols, such as methanol, ethanol and isopropanol, etc., and N,N-di(lower alkyl)alkanoamides such as N,N-dimethylformamide, N,N-dimethylacetamide, N,N-diethylformamide, N,N-diethylacetamide, N,N-di(n-propyl)formamide, N,N-dimethylpropionamide, and so forth, as well as mixtures of either of these two aforementioned type organic solvents with water. Upon completion of the reaction, the solvent is removed by means of conventional procedures and the resulting residue taken up in a suitable solvent system, such as one of the aforementioned types, from which it can be subsequently crystallized. Alternatively, the product may separate first from the reaction mixture either during the course of the reaction or immediately thereafter, or it may be crystallized from the reaction solution after some initial concentration of same. A final conversion to the desired organic base compound can then be effected by treating the 3-guanidinoalkylchroman acid addition salt thus obtained with sufficient base in water to neutralize same, e.g., an alkaline reagent such as sodium hydroxide in water can be used. Recovery of the desired free organic base can then be had by extracting the aforesaid aqueous solution with a suitable water-immiscible organic solvent of low volatility, such as a halogenated aliphatic hydrocarbon solvent like methylene chloride, for example.

The starting materials necessary for the above reaction process are either all known compounds or else they are easily prepared by those skilled in the art in accordance with standard organic procedures. For instance, the 3-aminoalkylchromans required for conversion to the guanidines can easily be prepared by known routes starting from the corresponding carboxylic acid amides which are, in turn, prepared from the chroman-3-carboxylic acids themselves. The amides are then converted to the amines by standard reductive methods for these purposes. The carboxylic acids concerned are obtainable by routes of themselves well-known in the art like that of Taylor and Tomlinson, for example, as described in the Journal of the Chemical Society, p. 2724 (1950) for the preparation of chroman-3-carboxylic acid. Needless to say, the corresponding S-alkyl isothiouronium salts, such as S-methyl isothiouronium sulfate, hydrochloride or hydriodide, for example, are all members of a well-known class of organic compounds.

Other methods which can be used to prepare the novel compounds of this invention include routes not involving the use of the S-alkyl isothiouronium intermediates and these are as follows: (1) the reaction of a 3-sulfonyloxyalkylchroman compound with the appropriate guanidine salt to afford the corresponding 3-guanidinoalkylchroman salt direct; (2) the reaction of a 3-aminoalkylchroman compound with a salt of the appropriate guanylpyrazole base, such as 3,5-dimethyl-1-guanylpyrazole, to also form the corresponding 3-guanidinoalkylchroman salt; (3) the reaction of a 3-aminoalkylchroman salt, such as a hydrohalide, with a cyanamide like the parent compound itself or an appropriately substituted derivative thereof or by fusion reaction of said amine salt with a dicyanamide compound to also form the corresponding 3-guanidinoalkylchroman salt direct; and finally, (4) the reaction of a 3-aminoalkylchroman compound with a cyanogen halide, like cyanogen bromide, followed by the reaction of the resultant intermediate N-cyano product with ammonia or with an appropriate amine to form the corresponding 3-guanidinoalkylchroman base.

Of all these alternate routes, the most preferred one is the previously mentioned process involving the reaction of a 3-aminoalkylchroman compound, such as 3-aminomethylchroman, with salt of the appropriate guanylpyrazole base to form the corresponding 3-guanidinoalkylchroman salt direct. The preferred reagent here is a salt of 3,5-dimethyl-1-guanylpyrazole, such as the corresponding sulfate, but it is also possible to employ other lower 3,5-dialkyl-1-guanylpyrazole salts in place of 3,5-dimethyl-1-guanylpyrazole sulfate and achieve equally satisfactory results as well. This particular process is generally carried out by heating the two reactants together in an aqueous solvent medium of the type previously discussed for the S-alkylisothiouronium method in the absence of any other reagent. Recovery of the desired product from the reaction mixture is then easily effected by evaporation of same under reduced pressure, followed by the subsequent crystallization of the resultant residue from either water or from an aqueous alcohol mixture.

Inasmuch as the products of most of the guanidine-forming reactions are obtained in the form of their salts, the free guanidine bases can thereafter easily be obtained by treatment of said salts with a suitably strong alkaline reagent, such as sodium hydroxide, as previously indicated. The free base compounds can then be isolated from the aqueous alkaline medium by means of extraction into a suitable water-immiscible organic solvent phase, preferably employing one of the lower boiling solvents such as a halogenated hydrocarbon solvent, like methylene chloride.

Insofar as the 3-guanidinoalkylchroman compounds of this invention are basic compounds, they are capable of forming a wide variety of salts with various mineral and organic acids. Although such salts must be pharmaceutically acceptable when the final products are intended for oral consumption, it is possible to first isolate the desired 3-guanidinoalkylchroman compound from the reaction mixture as a pharmaceutically unacceptable salt and then to subsequently convert the latter, as indicated previously, to the free base by treatment with an alkaline reagent, followed by the final conversion to the pharmaceutically acceptable acid salt in the manner hereinafter indicated. For instance, the acid addition salts of the 3-guanidinoalkylchroman compounds of this invention may be prepared by treating the base compound with a substantially equimolar amount of the chosen acid. The salt-formation step can be carried out in an aqueous solution or in a suitable organic solvent such as methanol or ethanol. Upon careful evaporation of the solvent, the solid salt is obtained.

The acids which are used to prepare the pharmaceutically acceptable acid addition salts of the aforementioned 3-guanidinoalkylchroman bases of this invention are those which form non-toxic acid addition salts containing pharmaceutically acceptable anions, such as the hydrochloride, hydrobromide, hydroiodide, nitrate, sulfate or bisulfate, phosphate or acid phosphate, acetate, lactate, citrate or acid citrate, tartrate or bitartrate, oxalate, succinate, maleate, gluconate, succharate, methanesulfonate, ethanesulfonate, benzenesulfonate and p-toluenesulfonate salts.

As previously mentioned, compounds of the present invention are readily adapted to therapeutic use as antihypertensive agents in view of their ability to lower the blood pressure of correspondingly hypertensive subjects. For instance, di(3-guanidinomethylchroman) sulfate has been found to produce a definite antihypertensive response in animals by lowering their blood pressure to a statistically significant degree when orally administered to them. At 5 mg./kg. body weight, this particular compound caused a mean arterial blood pressure fall of 76 mm. Hg in chloralosed cats for a period of one hour, while at 10 mg./kg., it produced a corresponding fall of 86 mm. Hg in anaesthetized dogs which lasted for more than 90 minutes. Although the compound displayed no adrenergic neurone blocking properties, it did exhibit pronounced adrenolytic effects in addition to being antagonistic toward the effects of tyramine in anaesthetized dogs. Furthermore, no problem of toxicity or any other untoward side effects arose or have ever been encountered when this compound is so administered to animals for the present purposes at hand.

In accordance with a method of treatment of the present invention, the herein described antihypertensives can be administered to a hypertensive subject via the oral or parenteral routes. In general, these compounds are most desirably administered in doses ranging from about 10 mg. up to about 240 mg. per day, although variations will necessarily occur depending upon the weight of the subject being treated and the particular route of administration chosen. However, a dosage level that is in the range of from about 0.15 mg. to about 4.8 mg. per kg. of body weight per day is most desirably employed in order to achieve effective results. Nevertheless, it is to be appreciated that still other variations may also occur in this respect, depending upon the individual response of the subject being treated to said medicament, as well as on the particular type of pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In accordance with the use of the 3-guanidinoalkylchroman compounds of this invention for the treatment of hypertensive subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various like combinations thereof.

For purposes of parenteral administration, solutions of these particular 3-guanidinoalkylchromans in sesame or peanut oil or in aqueous-propylene glycol or N,N-dimethylformamide may be employed, as well as sterile aqueous solutions of the corresponding water-soluble, non-toxic mineral and organic acid addition salts previously enumerated. Such aqueous solutions should be suitably buffered if necessary and the liquid diluent first rendered isotonic with sufficient saline or glucose. These particular aqueous solutions are especially suitable for intravenous, intramuscular and intraperitoneal injection purposes. In this connection, the sterile aqueous media employed are readily obtained by standard techniques well-known to those in the art. For instance, distilled water is ordinarily used as the liquid diluent and the final preparation is passed through a suitable bacterial filter, such as a sintered-glass filter or a diatomaceous-earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary steps should be taken throughout the preparation of these injectable solutions to ensure that the final products are obtained in a sterile condition.

This invention is further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims. In these examples, parts by weight bear the same relation to parts by volume as grams do to milliliters. Further, the percentage value expressed herein are always by weight except where otherwise stated.

Example I

A mixture consisting of 2.2 g. of 3-aminomethylchroman and 2.81 g. of 3,5-dimethyl-1-guanylpyrazole sulfate in 15 ml. of water was heated at 90° C. for 16 hours. The reaction mixture was then cooled to room temperature, and the solid material present was subsequently collected by means of suction filtration and then recrystallized from isopropanol-water (1:1 by volume) to give 2 g. (55%) of di(3-guanidinomethylchroman) sulfate, M.P. 278–280° C.

Analysis.—Calcd. for $C_{22}H_{32}N_6O_6S$: C, 51.96; H, 6.34; N, 16.53; S, 6.29. Found: 52.09; H, 6.38; N, 16.44; S, 6.03.

Example II

The procedure described in Example I is repeated employing 3-aminomethyl-7-chlorochroman in place of 3-aminomethylchroman on the same molar basis as before. In this particular case, the corresponding product obtained is di(3-guanidinomethyl-7-chlorochroman) sulfate.

In like manner, the use of 3-aminomethyl-6-bromochroman as a starting material in this reaction affords di-(3-guanidinomethyl-6-bromochroman) sulfate as the final produce.

Example III

The procedure described in Example I is repeated with 3-aminomethyl-5-methylchroman as the starting material in place of the 3-aminomethylchroman compound used before, but still maintaining the same molar proportions. In this particular case, the corresponding product obtained is di(3-guanidinomethyl-5-methylchroman) sulfate.

In like manner, the use of 3-aminomethyl-7-ethylchroman as a starting material in this reaction affords di(3-guanidinomethyl-7-ethylchroman) sulfate as the final product.

Example IV

The procedure described in Example I is repeated on the same molar basis as before except that 3-aminomethyl-6-methoxychroman is the starting material employed in place of 3-aminomethylchroman. In this particular case the corresponding product obtained is di(3-guanidinomethyl-6-methoxychroman) sulfate.

In like manner, the use of 3-aminomethyl-8-isopropoxychroman as a starting material in this reaction affords di(3-guanidinomethyl-8-isopropoxychroman) sulfate as the final product.

Example V

The procedure described in Example I is repeated on the same molar basis as before except that 3-aminomethyl-2-methylchroman is the starting material employed in place of 3-aminomethylchroman. The corresponding product obtained in this particular case is di(3-guanidinomethyl-2-methylchroman) sulfate.

In like manner, the use of 3-aminomethyl-4-(n-propyl)chroman as a starting material in this reaction affords di-[3-guanidinomethyl-4-(n-propyl)chroman] sulfate as the final product which is obtained.

Example VI

The procedure described in Example I is repeated with 3-aminoethylchroman as the starting material of choice in place of the corresponding methyl compound, using the same molar proportions, of course. The particular product obtained in this case is di[3-(2-guanidinoethyl)chroman] sulfate.

In like manner, the use of 3-(3-aminopropyl)chroman as a starting material in this reaction affords di[3-(3-guanidinopropyl)chroman] sulfate as the final product which is obtained.

Example VII

A solution of 5.0 g. of 3-aminomethylchroman and 3.48 g. of S-methyl isothiouronium sulfate in 35 ml. of water was heated under reflux for four hours. The mixture was then cooled, and the solid material that separated was subsequently collected by means of suction filtration and then recrystallized from isopropanol-water (1:1 by volume) to give 5 g. (65%) of di(3-guanidinomethylchroman) sulfate, M.P. 278–280° C.

Example VIII

Ten parts by weight of di(3-guanidinomethylchroman) sulfate in 50 parts by volume of water is neutralized with 10N sodium hydroxide solution. Extraction of the resulting aqueous solution with several portions of methylene chloride, followed by separation of the organic layer and its subsequent concentration under reduced pressure then affords 3-guanidinomethylchroman as a free base.

In like manner, when each of the other 3-guanidinoalkylchroman salt compounds reported in Examples II–VII is subject to this same reaction procedure, the corresponding free organic base is always the product obtained.

Example IX

The following 3 - guanidinoalkylchromans can be prepared according to the procedures described in the previous examples from the appropriate starting compounds:

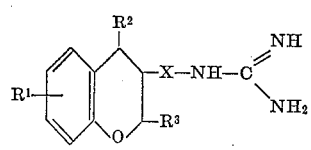

| R₁ | R₂ | R₃ | X |
|---|---|---|---|
| 5-Br | H | H | CH₂ |
| 7-CH₃ | H | H | C₃H₆ |
| 8-Cl | H | CH₃ | C₃H₆ |
| 6-CH₃ | H | H | CH₂ |
| H | H | CH₃ | C₃H₆ |
| H | C₂H₅ | H | C₂H₄ |
| 7-C₃H₇ | H | C₂H₅ | C₃H₆ |
| 8-C₂H₅ | CH₃ | H | C₃H₆ |
| 5-OC₂H₅ | H | n-C₃H₇ | CH₂ |
| 6-Cl | H | H | C₂H₄ |
| 7-OCH₃ | H | H | C₃H₆ |
| 7-CH₃ | H | H | CH₂ |
| 8-Br | C₂H₅ | H | C₃H₆ |
| 8-C₃H₇ | H | H | CH₂ |
| 7-Br | H | CH₃ | C₂H₄ |
| 6-Cl | H | H | C₃H₆ |

*Example X*

The non-toxic hydrohalide acid addition salts of each of the 3-guanidinoalkylchroman bases reported previously in Examples VIII–IX, such as hydrochloride, hydrobromide and hydriodide salts thereof, are individually prepared by first dissolving the respective organic base compound in absolute ether followed by introduction of the appropriate hydrogen halide gas into the reaction solution until saturation of same is complete with respect to said gas, whereupon the desired salt precipitates from solution. The crystalline product so obtained is then recrystallized from a suitable solvent to yield the pure hydrohalide salt. For instance, when 1.0 g. of 3-guanidinomethylchroman is dissolved in anhydrous diethyl ether and dry hydrogen chloride gas is subsequently passed into the resulting solution until saturation of same is complete with respect to said gas, there is obtained a crystalline precipitate of 3-guanidinomethylchroman hydrochloride.

*Example XI*

The nitrate, sulfate or bisulfate (other than those previously recorded), phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts of each of the 3-guanidinoalkylchroman bases previously reported in Examples VIII–IX are all prepared by separately dissolving in a suitable amount of ethanol the proper molar amounts of the respective acid and the appropriate organic base and then mixing the two solutions together, followed by the addition of diethyl ether to the resulting reaction solution in order to effect precipitation of the desired acid addition salt therefrom. For instance, when equivalent amounts of 3-guanidinomethylchroman and concentrated sulfuric acid react in accordance with this procedure, the corresponding product obtained is di(3-guanidinomethylchroman) sulfate. In like manner, each of the other salts are similarly prepared.

What is claimed is:

1. A compound selected from the class consisting of organic bases of the formula:

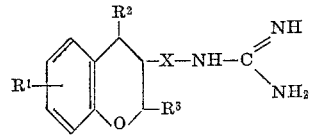

and the mineral and organic acid addition salts thereof, wherein $R^1$ is a member selected from the group consisting of hydrogen, chlorine, bromine, lower alkyl and lower alkoxy; $R^2$ and $R^3$ are each a member selected from the group consisting of hydrogen and lower alkyl; and X is lower alkylene.

2. A compound of claim 1 wherein $R^1$, $R^2$ and $R^3$ are each hydrogen.

3. A compound of claim 1 wherein $R^1$ is chlorine and $R^2$ and $R^3$ are each hydrogen.

4. A compound of claim 1 wherein $R^1$ is lower alkyl and $R^2$ and $R^3$ are each hydrogen.

5. A compound of claim 1 wherein $R^1$, $R^2$ are each hydrogen and $R^3$ is methyl.

6. 3-guanidinomethylchroman.
7. 3-guanidinomethyl-2-methylchroman.
8. 3-(3-guanidinopropyl)chroman.
9. 3-guanidinomethyl-7-chlorochroman.

References Cited

UNITED STATES PATENTS 3,330,838   7/1967   Augstein et al. __ 260—345.2 XR

JOHN D. RANDOLPH, *Primary Examiner.*

J. M. FORD, *Assistant Examiner.*